J. S. LAFLEUR.
HAY PRESS.
APPLICATION FILED JULY 3, 1909.
956,111.
Patented Apr. 26, 1910.
3 SHEETS—SHEET 2.
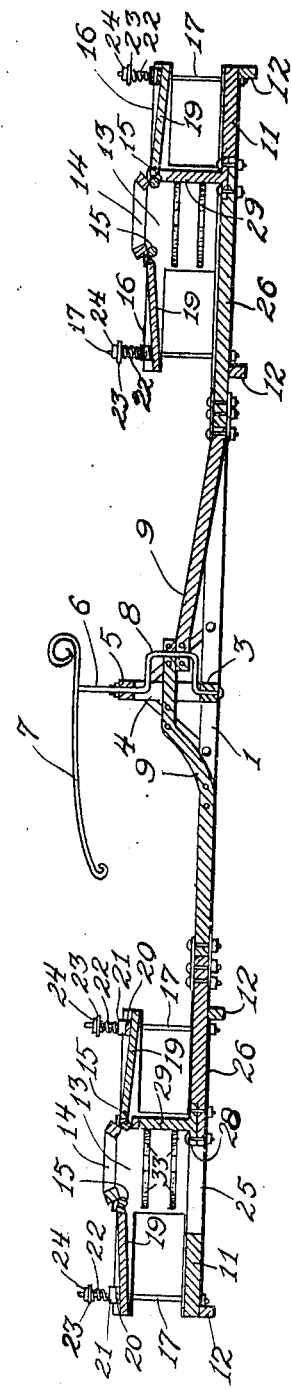
Witnesses
Inventor
Jean S. Lafleur,
his Attorney.

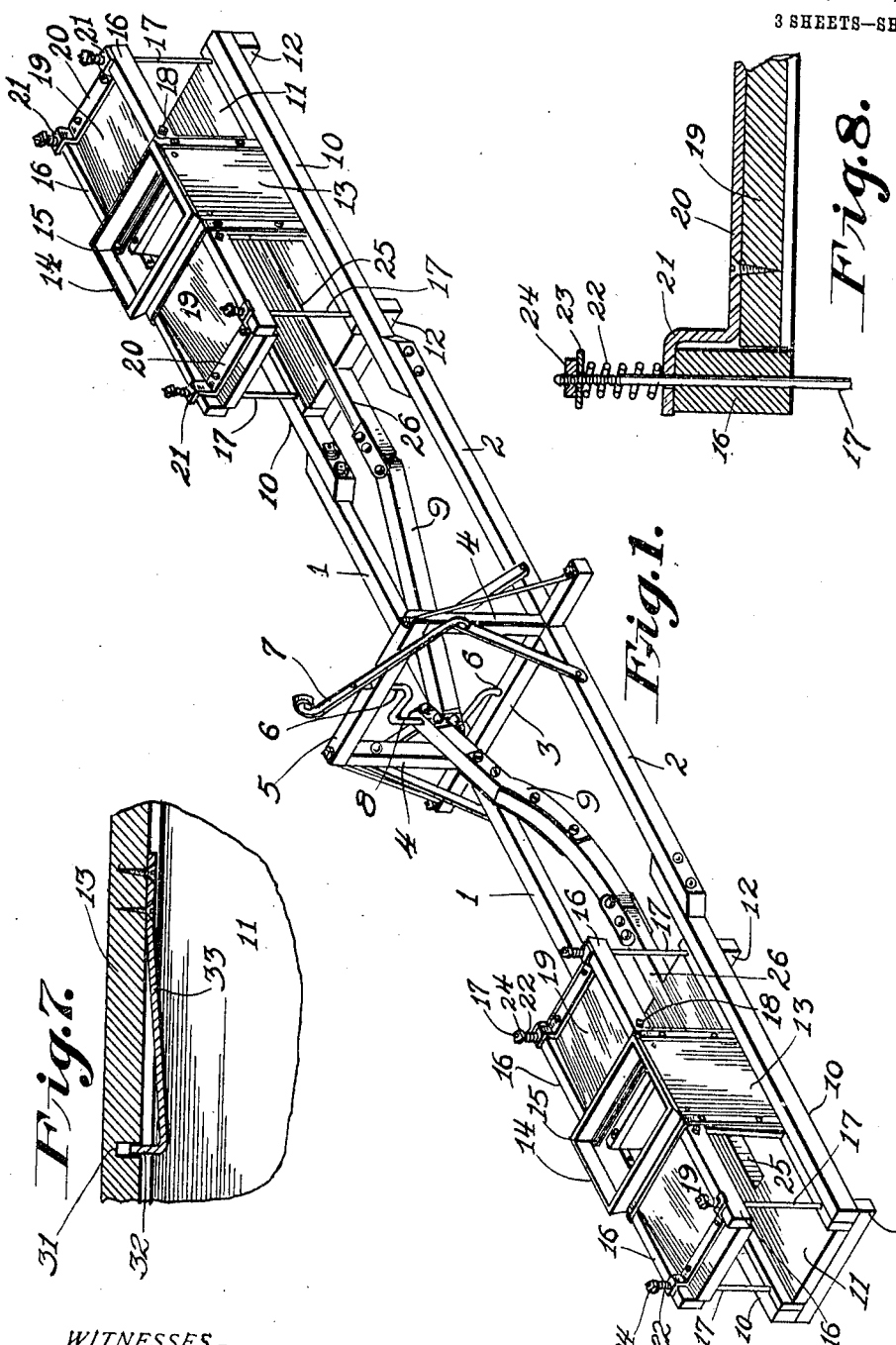

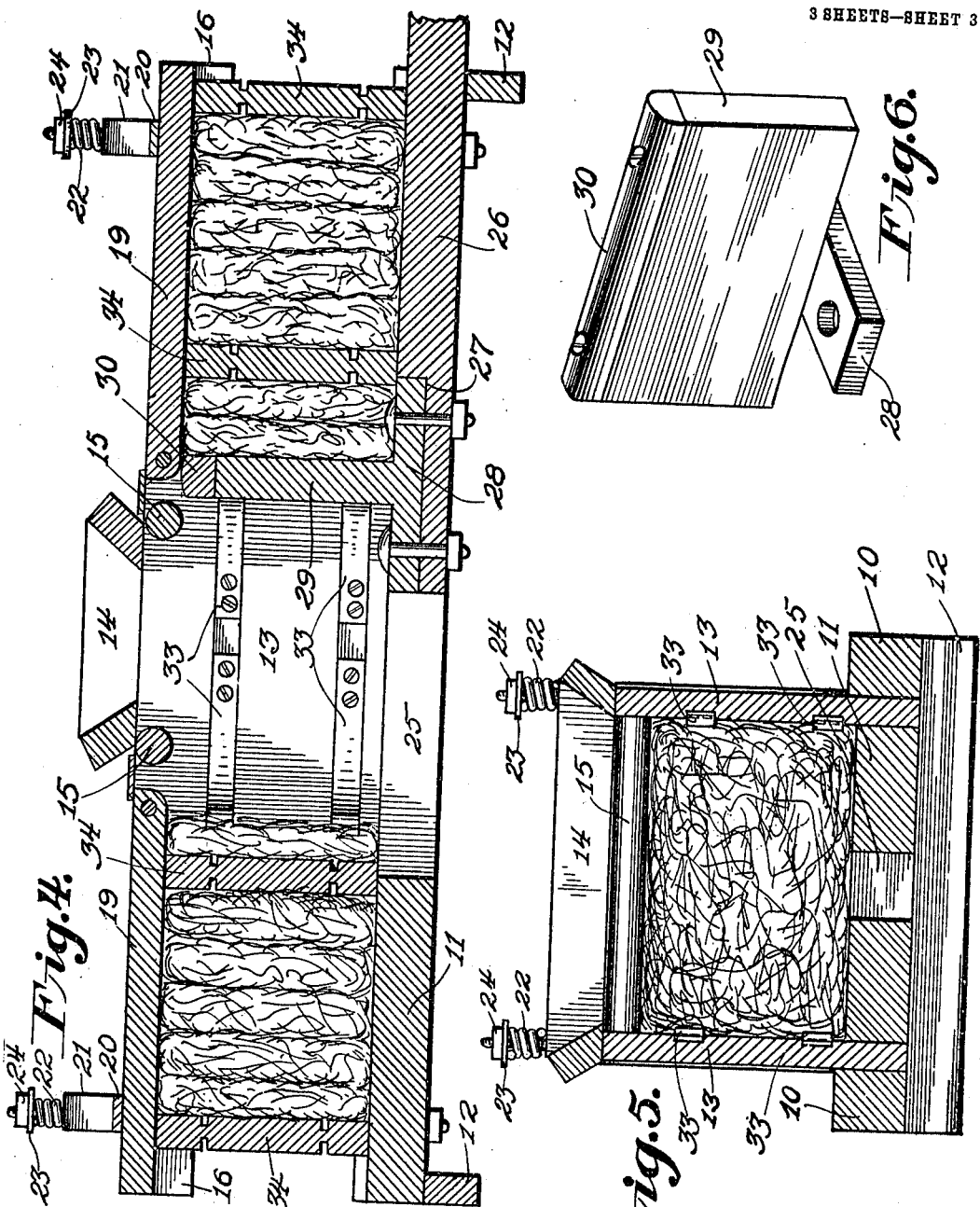

UNITED STATES PATENT OFFICE.

JEAN S. LAFLEUR, OF VILLE PLATTE, LOUISIANA.

HAY-PRESS.

956,111. Specification of Letters Patent. Patented Apr. 26, 1910.

Application filed July 3, 1909. Serial No. 505,856.

*To all whom it may concern:*

Be it known that I, JEAN S. LAFLEUR, a citizen of the United States, residing at Ville Platte, in the parish of St. Landry and State of Louisiana, have invented certain new and useful Improvements in Hay-Presses, of which the following is a specification, reference being had therein to the accompanying drawing.

This invention relates to baling presses and has specially in view a press of the character described in which two press boxes are employed, each box being provided with a central hopper and a plunger, the plunger being adapted to operate upon material fed to the boxes through said hoppers on both its forward and rearward movement so that four bales may be formed at one operation of the machine.

In carrying out the object of the invention generally stated above it will be understood, of course, that the essential features thereof are susceptible of changes in details and structural arrangements, but a preferred and practical embodiment of the same is shown in the accompanying drawings wherein—

Figure 1 is a perspective view of the improved double acting baling press. Fig. 2 is a top plan view. Fig. 3 is a central longitudinal sectional view taken on the line 3—3, Fig. 2. Fig. 4 is a vertical longitudinal sectional view of one of the press boxes. Fig. 5 is a transverse sectional view taken on the line 5—5, Fig. 2. Fig. 6 is a detail perspective view of one of the plungers. Fig. 7 is a detail fragmentary view of an interior portion of one of the press boxes showing the side springs therein. Fig. 8 is a detail sectional view of one end of one of the press boxes showing the manner of mounting the pressure plates.

Referring to said drawings by numerals 1 and 2 designate the spaced apart parallel base members of the frame of the machine, said base members being connected at their central portions by the transversely extending bar 3 which supports the two oppositely disposed standards 4 which are connected by the transversely extending bar 5 which has its ends rigidly secured to the tops of said standards. Said bar 5 forms the upper bearing for the power shaft 6 the lower end of which is journaled in the base bar 3. Said shaft 6 has its upper end projected beyond the upper bar 5 and is provided with a lever 7 by means of which said shaft may be rotated either manually or by horsepower, as will be obvious. The intermediate portion of said shaft 6 is provided with a crank 8 which carries a pair of oppositely projecting pitmen 9.

The ends of the base members 1 and 2 carry outwardly projecting extensions 10 which are in the same plane as said members and extend alongside of and are suitably secured to the base or flooring 11 of the end press boxes. Said floorings are retained in spaced relation to the ground or other surface by means of the transversely extending beams 12. The vertical sides 13 of said boxes are connected at their tops by means of the rectangular framing 14 which forms a hopper through which material is fed to said boxes, such feeding being facilitated by means of the interior rollers 15 which extend transversely across the inner edges of said hoppers. A pair of parallel longitudinally extending beams 16 are carried by each hopper, said beams extending on opposite sides thereof and have their ends supported by means of the bolts 17 which extend to said flooring 11. The inner ends of said beams are connected by means of a pivot bolt 18 upon which one end of a pressure plate 19 is pivotally mounted, the outer end of said plate being provided with a transversely extending strap 20 the ends of which are bent on an upwardly extending angle 21 and are provided with an opening for slidable engagement with the ends of said bolts 17 which project above said beams 16. Said upper or projected ends of said bolts are threaded and have a spring 22 coiled about them the lower end of which bears upon the angular ends of said strap 20, the upper end of said spring bearing upon a washer 23, a lock nut 24 being employed to regulate the tension of the springs.

The flooring 11 of each press box is provided with a centrally located longitudinally extending guide slot 25 which projects from its inner edge to a point beyond the central portion thereof. A plunger rod 26 is slidably mounted in each slot, the end of said rod within the box being provided with a reduced flat portion forming a seat 27 for the bolting flange 28 of the plunger 29 the top edge of which is rounded as indicated at 30 to facilitate its passage past or beneath the rollers 15. The vertical sides of the boxes are provided with openings 31 which receive the angular ends 32 of the flat springs 33 which have their other ends rigidly secured to said sides. Said springs normally have their angular ends 32 projecting toward the center of the boxes to provide catches for preventing the spacer blocks 34 being forced into the boxes. The springs are in the path of movement of the plungers and their angular ends 32 are forced into the opening 31 on the bale pressing movements of the plungers, and automatically return to their block holding position on the reverse movements of the plungers.

In operation the material is fed into the boxes through the hoppers and the shaft 6 operated to reciprocate the plungers through the press boxes. On the outward movement of one of the plungers the material fed into the box will be compressed and in the meantime more material may be fed into the box so that the same may be compressed on the inward movement of said plunger, and as two plungers are employed, it will be seen that simultaneously a bale is being formed in one box by the outward movement of its plunger, while in the other box the inward movement of the plunger is forming another bale.

It will be seen from the foregoing that in addition to providing means whereby four bales may be formed by a complete rotation of the shaft, the pressure plates which extend from each end of the hoppers serve to hold the formed bales in proper position to oppose the movements of said plungers so as to materially assist in the formation of the other bales. And, as suggested in Fig. 4, the spacer blocks 34 may be employed to afford a firm backing for the formed bales.

A prominent feature of the invention is in the manner in which the plungers are guided in their movements through the press boxes, as it will be seen that the slots in the floorings 11 of said boxes readily hold the plunger rods to a straight movement through said boxes.

What I claim as my invention is:—

1. A baling press comprising a power shaft, a pair of oppositely-projecting pitmen, oppositely-disposed end press boxes, a flooring for each box provided with a medial guide-slot, a plunger in each box, said plunger having a flanged base, and a plunger rod having a terminally rabbeted portion which is designed to receive, and be secured to, the flanged base of said plunger, said rods being connected to said pitmen.

2. A baling press comprising a power-shaft, oppositely-disposed press boxes, pitmen arms leading from said boxes and mounted upon said power-shaft, plungers mounted upon said pitmen and within said boxes, one of said pitmen formed of two pieces pivotally joined together, the inner piece sloping at an upward angle from said joint to said power shaft, the other of said pitmen arms also formed of two pieces pivotally joined together, the inner one of said pieces having a straight body portion, an intermediate upwardly-curved portion and a straight end portion parallel with said body portion.

3. A baling press comprising a power shaft, oppositely-disposed pitmen mounted thereon, press boxes provided with anti-friction rollers, a plunger attached to each of said pitmen and operating in said press boxes, said plungers having rounded tops to facilitate their passage under said anti-friction rollers.

In testimony whereof I hereunto affix my signature in presence of two witnesses.

JEAN S. LAFLEUR.

Witnesses:
C. B. AUDREY,
CHAS. F. BOAGNI.